(12) United States Patent
Walecka et al.

(10) Patent No.: US 11,637,516 B2
(45) Date of Patent: Apr. 25, 2023

(54) FIELD-ORIENTED CONTROL (FOC) OF MULTI-PHASE MOTORS FOR PREVENTION OF THERMAL BATTERY RUNAWAY

(71) Applicant: Raytheon Company, Waltham, MA (US)

(72) Inventors: Andrew C. Walecka, Tucson, AZ (US); Andrew Thompson, Vail, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/379,450

(22) Filed: Jul. 19, 2021

(65) Prior Publication Data

US 2023/0013620 A1    Jan. 19, 2023

(51) Int. Cl.
*H02P 21/10*    (2016.01)

(52) U.S. Cl.
CPC .................. *H02P 21/10* (2013.01)

(58) Field of Classification Search
CPC ............. H02M 3/1582; H02M 3/1584; H02M 3/1588; H02M 3/1586; H02P 21/04; H02P 21/36; H02P 31/00; B60L 15/025
See application file for complete search history.

(56) References Cited

U.S. PATENT DOCUMENTS

| | | | |
|---|---|---|---|
| 3,805,135 A | 4/1974 | Blaschke | |
| 5,227,703 A | 7/1993 | Boothe et al. | |
| 7,683,570 B2 | 3/2010 | Krauer et al. | |
| 7,821,224 B2 | 10/2010 | Baglino et al. | |
| 7,847,501 B2 | 12/2010 | Baglino et al. | |
| 8,970,147 B2 | 3/2015 | Baglino et al. | |
| 2010/0090629 A1* | 4/2010 | Tang | B60L 15/2045 180/65.285 |
| 2013/0193896 A1* | 8/2013 | Lynn | H02M 3/1584 318/490 |

(Continued)

FOREIGN PATENT DOCUMENTS

EP    2665179 A1    11/2013

OTHER PUBLICATIONS

Eagle Picher Technologies "A Bundle of Energy: Thermal Battery Technology", Retrieved from Internet. URL: <https://www.eaglepicher.com/products/thermal-batteries/#:~:text=Thermal%20battery%20technology%20is%20comprised%20of%20stacked%20series,following%20benefits%3A%20The%20highest%20capacity%20per%20unit%20volume>, 8 pgs.

(Continued)

*Primary Examiner* — Said Bouziane
(74) *Attorney, Agent, or Firm* — Schwegman Lundberg & Woessner, P.A.

(57) ABSTRACT

A system and method uses field-oriented control (FOC) of a multi-phase motor to prevent thermal runaway of the thermal battery that powers the motor. An offset is applied to the flux command signal to ensure that the power level drawn from the thermal battery exceeds a minimum power level to avoid thermal runaway. This is done without any additional hardware, hence the reduced cost, inefficiencies and packaging volume of such hardware. In different modes, the offset is applied to prevent thermal runaway regardless of torque production, when the system is in failure and torque production is zero, for variable and intermittent periods when torque production is zero, and during normal operation to augment power drawn to produce torque.

20 Claims, 5 Drawing Sheets

(56) References Cited

U.S. PATENT DOCUMENTS

2019/0269998 A1 9/2019 Doerksen et al.
2021/0094442 A1 4/2021 Wang et al.

OTHER PUBLICATIONS

Guidotti, Ronald A., "Thermal Batteries: A Technology Review and Future Directions", 27th International SAMPE Technical Conference, Oct. 9-12, 1995, (Jul. 1, 1995), 13 pgs.
Guidotti, Ronald A., et al., "Thermally activated ("thermal") battery technology Part I: An overview", Journal of Power Sources 161, (2006), 1443-1449.
Keener, Melissa, "Reliability of Thermal Batteries", (2014), 7 pgs.
Lamb, Charles M., "Thermal Batteries", Thomas B. Reddy. Linden's Handbook of Batteries, Fourth Edition, Chapter 36, (2011, 2002, 1995, 1984), 20 pgs.
Ramamoorthy, Ramesh T., et al., "Sensored Field Oriented Control of 3-Phase Permanent Magnet Synchronous Motors Using TMS320F2837x", Texas Instruments, Application Report, SPRZBZ0, (Feb. 2016), 39 pgs.
"International Application Serial No. PCT/US2022/037437, International Search Report dated Nov. 8, 2022", 5 pgs.
"International Application Serial No. PCT/US2022/037437, Written Opinion dated Nov. 8, 2022", 6 pgs.

\* cited by examiner

FIELD-ORIENTED CONTROL (FOC) OF MULTI-PHASE MOTORS FOR PREVENTION OF THERMAL BATTERY RUNAWAY

GOVERNMENT LICENSE RIGHTS

This invention was made with government support under HR0011-17-C-0025 awarded by the United States Department of Defense. The government has certain rights in this invention.

BACKGROUND OF THE INVENTION

Field of the Invention

This invention relates to Field-Oriented Control (Vector Control) of multi-phase motors, and more particularly to the use of FOC to prevent thermal runaway of the thermal batteries that power the multi-phase motors.

Description of the Related Art

Multi-phase motors (e.g., two or more phases) constitute both AC and synchronous DC motors including, but not limited to, Permanent Magnet Synchronous Motors (PMSM), Brushless DC (BLDC), induction, stepper, switched and variable reluctance and similarly configured motors. Field-Oriented Control (FOC) (also called Vector Control) is a well-established method to control multi-phase motors to increase top speed and achieve higher motor drive efficiencies. The concept is to control AC machines like DC machines, providing independent control of flux and torque producing currents through mathematical transforms that move between the torque and flux currents and the multi-phase drive signals.

FOC includes a motor controller that generates one or more motor control signals to drive the multi-phase motor, the one or more motor control signals being responsive to a torque command signal (IQ, Motor Quadrature Axis) and a magnetic flux command signal (ID, Motor Direct Axis). A torque command calculator generates the torque command signal IQ to command a desired torque. A flux command calculator generates flux command signal to command a desired flux. The torque and flux can be controlled independently.

In normal operation, the IQ torque current is driven to a desired torque for the servo controller in response to an external command signal. The ID flux current is driven with an input command (e.g., set-point) of zero during normal operation in which the objective is efficient torque generation. Proportional-integral (PI) control loops or similar maintain the measured IQ and ID at their reference values. The motor controller transforms the IQ and ID pair into the multi-phase motor control signals that drive the motor.

Techniques do exist to drive ID at non-zero values. A technique known as "Field Weakening" establishes a negative set-point for ID that has the effect of improving the speed of the motor at the expense of torque. U.S. Pat. No. 7,847,501 entitled "Varying Flux Versus Torque For Maximum Efficiency" discloses modulating the flux according to the desired torque to increase the efficiency or decrease the power loss of an electric vehicle. U.S. Pat. No. 8,970,147 entitled "Traction Motor Controller with Dissipation Mode" discloses generating an inefficient flux to warm the electric vehicle's batteries to mitigate cold ambient performance degradation.

The motor controller draws current (power) from an energy storage system i.e., batteries to power and drive the multi-phase motor. A common type of battery may be referred to as an "energy-storage" battery. The energy-storage battery stores an amount of energy that can be drawn over time to power the multi-phase motor. Some energy-storage batteries are primary reserve batteries in which charge can be drawn continuously or intermittently as needed over time but once depleted cannot be recharged. Others are secondary reserve batteries that may be recharged. Energy-storage batteries find wide use in commercial applications such as electric vehicles and the like. A less common type of battery is a thermally activated ("thermal") battery. Thermal batteries are primary batteries that include an ignitor configured to initiate a reaction of materials (e.g., inorganic salt electrolytes), which once ignited burn until they are depleted. Thermal batteries may have a shelf life of 10-25 years and provide higher peak-power densities than energy-storage batteries. Once activated and discharged, thermal batteries are not reusable or rechargeable. For these reasons, thermal batteries are often used in military applications such as missiles, bombs and the like.

Both the energy-storage and thermal batteries are susceptible to a phenomenon known as "thermal runaway." Although the mechanisms differ, essentially when the battery temperature gets too hot the materials start to degrade and decompose causing a chain reaction, which can result in a rupture of the battery and possible explosion. With an energy-storage battery, thermal runaway may be caused by the external operating temperature getting too high or overcharging or discharging the battery (e.g., moving too much current too quickly). Prevention measures include cooling systems to maintain a desired operating temperature range and control systems that limit the amount and rate of current charging or discharging. With a thermal battery, once ignited the materials continue to react and produce energy as the materials are depleted. If at least a minimum amount of power is not drawn from the thermal battery over time it can overheat and cause thermal runaway and possible 'venting/rupture' can occur. Venting presents a serious safety concern to the system or user of the battery. To prevent thermal runaway using a hardware technique, a fixed or switched resistor can be placed across the battery to draw sufficient current (power) from the battery to prevent runaway.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for using field-oriented control (FOC) of a multi-phase motor to prevent thermal runaway of the thermal battery that powers the motor. This is done without any additional hardware, hence reduces the cost, inefficiencies and packaging volume of such hardware. The additional processing can be implemented on the same motor control processor e.g., a Digital Signal Processing (DSP) board or a Field-Programmable Gate Array (FPGA) as the existing motor controller.

A controller for a multi-phase motor includes a field-oriented motor controller that generates one or more signals for the multi-phase motor, those signals being responsive to a torque command signal and a flux command signal. Torque and flux command calculators are configured to generate the torque and flux commands to command a desired torque and desired flux. The multi-phase motor is powered by a thermal battery, which upon initiation delivers electrical power. The motor must draw at least a minimum power level to prevent thermal runaway of the thermal battery.

A power controller is configured to generate an offset to the flux command signal to draw power from the thermal battery at a power level that exceeds the minimum power level to prevent thermal runaway while providing said desired torque. Any additional power drawn from the thermal battery responsive to the offset of said flux command is dissipated as heat in the multi-phase motor and accompanying power electronics.

The power controller can be configured to execute a number of different modes including but not limited to safety, failure, optimized and mission-responsive modes. In the safety mode, the power controller provides a fixed offset such that the flux command signal draws sufficient power to prevent thermal runaway regardless of any power drawn by the torque command signal to apply torque to the motor. In a failure mode, the torque command signal is set to zero and the power controller generates the offset such that the flux command signals draws all of the power from the battery (all of which is dissipated as heat in the motor) to prevent thermal runaway. In an optimized mode, the power controller is responsive to a real-time measure of the actual power drawn from the battery to calculate the required offset to prevent thermal runaway. A portion of the actual power is used to provide the desired torque to the multi-phase motor while the remaining portion of the actual power is dissipated as heat in the multi-phase motor and accompanying power electronics. The real-time measure may be a direct measurement of the current drawn from the thermal battery of a measurement of the torque phase current fed back to the motor-controller. In a mission-responsive mode, the power controller is configured to respond to variable and intermittent time periods of zero torque production to apply the offset to the torque command signal to draw sufficient power to prevent thermal runaway.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a system and method for using field-oriented control (FOC) of a multi-phase motor to prevent thermal runaway of the thermal battery that powers the motor. This is done without any additional hardware, hence reduces the cost, inefficiencies and packaging volume of such hardware. The additional processing can be implemented on the same motor control processor e.g., a Digital Signal Processing (DSP) board or a Field-Programmable Gate Array (FPGA) as the existing motor controller.

Figure 1:
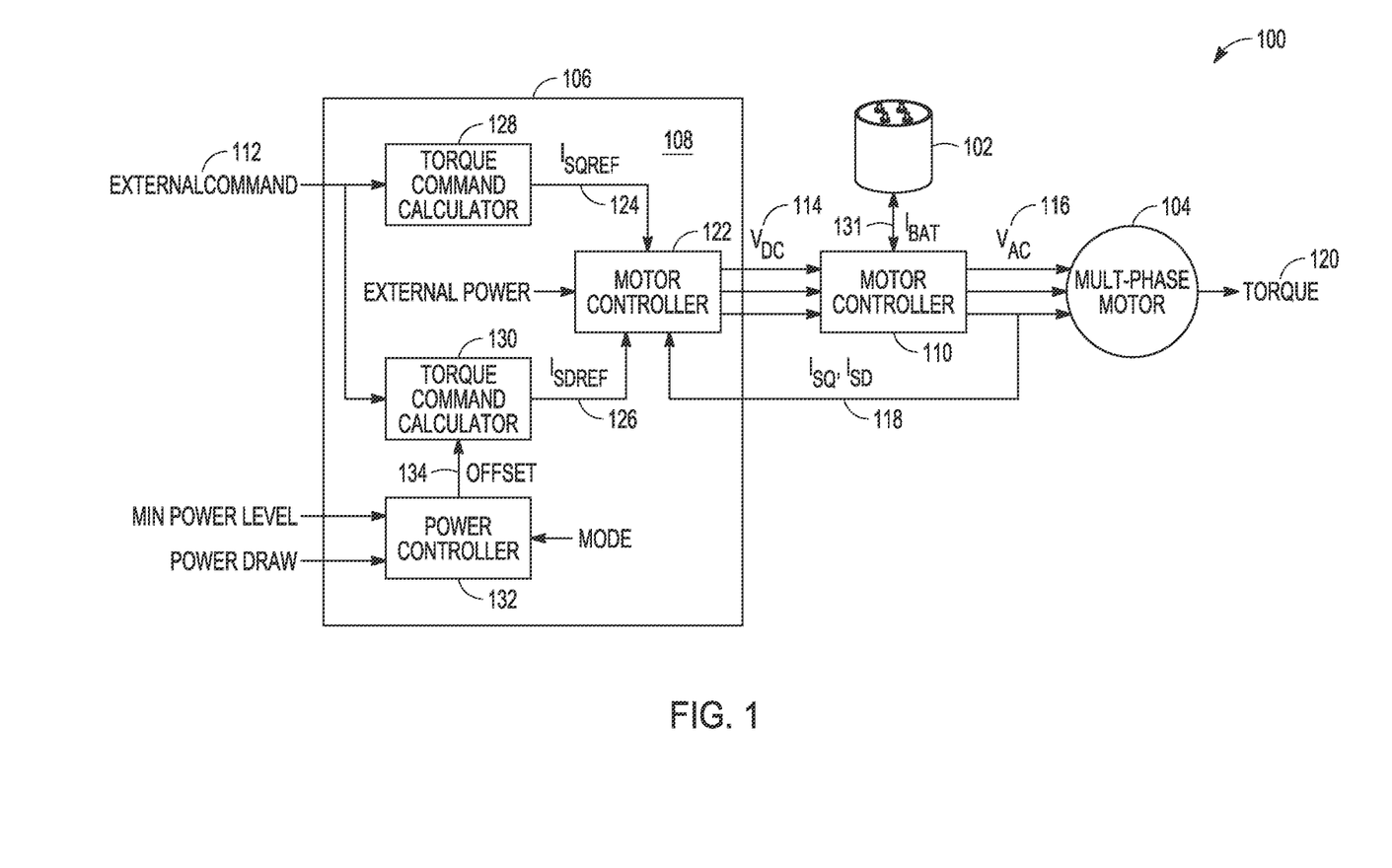
FIG. 1 is a block diagram of an embodiment of a system for field-oriented control of a multi-phase motor to prevent thermal runaway of the thermal battery that powers the system.

Referring now to FIG. 1, a motor system 100 includes a thermal battery 102, a multi-phase motor 104, a controller 106 suitably implemented on a DSP board 108, and a power inverter 110. Thermal battery 102 supplies electrical power to at least the power inverter 110 and multi-phase motor 104 and possibly the DSP board 108. The DSP board may receive external power from another source, for example, the guidance system in a missile. Controller 106, responsive to an external command 112 such as a position or velocity command and phase current measurements $I_{SQ}$ and $I_{SD}$ 118 for torque and flux, generates motor control signals 114 (DC voltages) to provide a desired torque and flux. The power inverter 110 converts the DC voltages ($V_{DC}$) 114 to AC voltages ($V_{AC}$) 116 to drive multi-phase motor 104 to produce the desired torque 120.

Controller 106 includes a field-oriented motor controller 122 configured to generate one or more motor control signals 114 for the multi-phase motor. The one or more motor control signals are responsive to a torque command signal $I_{SQREF}$ 124 and a flux command signal $I_{SDREF}$ 126. A torque command calculator 128, coupled to the field-oriented motor controller, is configured to generate the torque command signal $I_{SQREF}$ 124 to command a desired torque. A flux command calculator 130, coupled to the field-oriented motor controller, is configured to generate the flux command signal $I_{SDREF}$ 126 to command a desired flux. Field-oriented motor controller 122 implements a set of transforms to convert for Q, D space into the multi-dimension space to drive the multi-phase motor. In normal operation, flux command signal $I_{SDREF}$ 126 is set to zero to maximize torque production from the motor. The flux phase current measurement $I_{SD}$ that is fed back may be noisy about zero due to the real-time control. Although essentially the flux command signal must exist to support the transformations back and forth between Q, D space and the multi-dimensional space for the motor.

Thermal battery 102 can be stored for many years, e.g., 10-25 years, before use. The battery includes an initiator that starts an electro-chemical process that delivers current (power). The process continues uninterrupted until the materials are depleted. As a consequence, the thermal battery is continuously creating power e.g., battery current $I_{BAT}$ 131. This power must be drawn from the battery at some minimum power level over a period of time. Otherwise the battery will overheat and enter thermal runaway and possible 'venting/rupture' can occur. Venting presents a serious safety concern to the system or user of the battery. How much power much be drawn from the battery and what time period depends on the composition and design of the battery. For example, a given battery may require that X amps of current be drawn every Y hours until the battery is depleted.

To prevent thermal runaway of thermal battery 102, an additional power controller 130 is implemented on the existing DSP board 108 as part of controller 106. Power controller 132 is configured to generate an offset 134 to the flux command signal 126 to draw power from the thermal battery at a power level that exceeds the minimum power level to prevent thermal runaway while providing the desired torque. Offset 134 can be either positive or negative and may be added directly to the flux command signal or provided as an input to the flux command calculator 130.

The offset may be provided as a constant term or may be pulse-width modulated. Any additional power drawn from the thermal battery 102 responsive to the offset of the flux command is dissipated as heat in the multi-phase motor (defined to include the motor, the power inverter, any wiring etc.). The power controller may receive as inputs the minimum power level (draw from the battery) that must be satisfied, a measured power draw and a mode of operation.

Referring now to FIGS. 2A-2D, the power controller can be configured to execute a number of different modes including but not limited to optimized, failure, safety and mission-responsive modes.

Figure 2A:
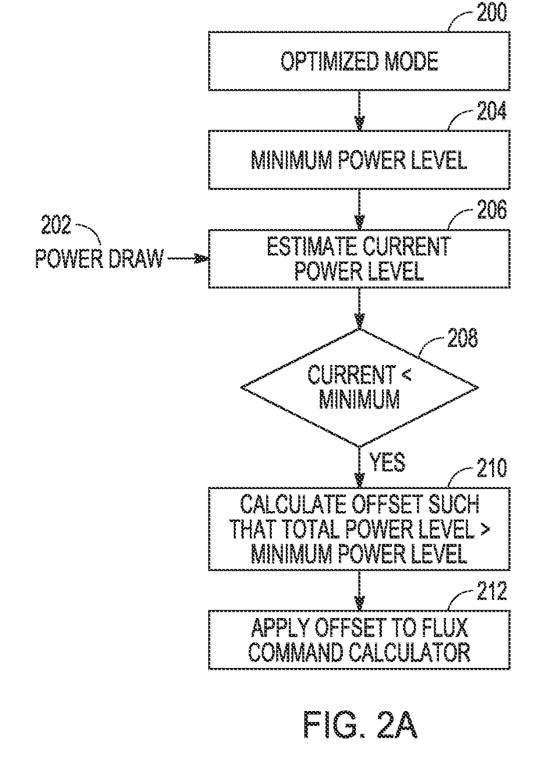
FIGS. 2A-2D are flow diagrams for optimized, failure, safety and mission-responsive modes for preventing thermal runaway.

As shown in FIG. 2A, in an optimized mode 200, the power controller is responsive to a real-time measure 202 of the actual power drawn from the thermal battery and the minimum power level 204 to estimate the current power level (step 206) and compare the current power level to the minimum power level 204 (step 208). If the current power level is less than the minimum power level 204 (insufficient to prevent thermal runaway), the power controller computes an offset such that the total power level will exceed the minimum power level (step 210) and applies the offset to the flux command calculator (step 212). The additional power drawn from the battery is dissipated as heat in the multi-phase motor.

Figure 2B:
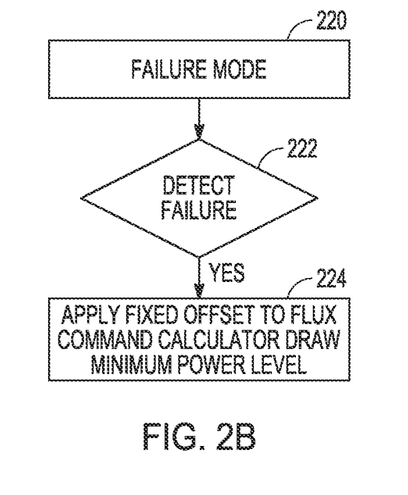

As shown in FIG. 2B, in a failure mode 220, if a failure is detected (step 222), the system sets the torque command signal to zero, and the power controller applies a fixed offset to the flux command calculator to the draw at least the minimum power level to prevent thermal runaway (step 224). Thermal runaway is a particular concern in a failure mode situation because the motor is not drawing current and the battery can rapidly overheat and fail presenting a danger to the entire system and any users.

Figure 2C:
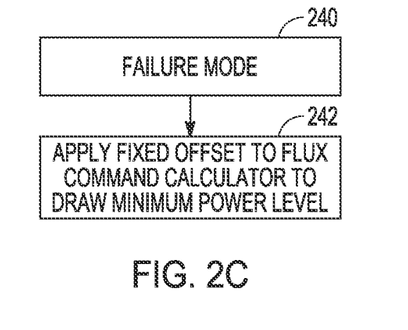

As shown in FIG. 2C, in a safety mode 240, the power controller provides a fixed offset such that the flux command signal draws sufficient power to prevent thermal runaway regardless of any power drawn by the torque command signal to apply torque to the motor (step 242). Safety mode may be useful in situations in which measuring the current power draw from the battery is not practical or in which failure of the battery must be avoided at all costs, even to accept wasting of battery power to ensure thermal runaway does not occur.

Figure 2D:
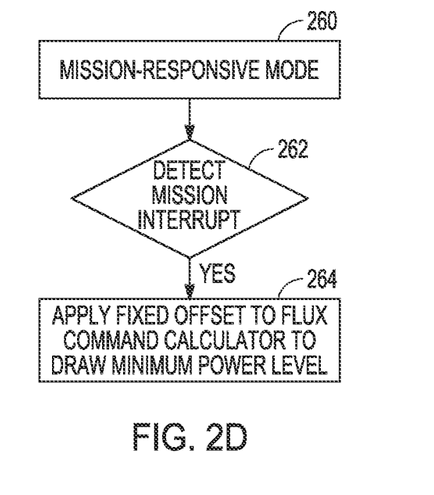

As shown in FIG. 2D, in a mission-responsive mode 260, the power controller is configured to respond to variable and intermittent time periods of zero torque production due to planned or unplanned interruptions in the mission. In this mode, it is assumed that when operational the multi-phase motor draws sufficient power to prevent thermal runaway. If a mission interrupt is detected (step 262), the power controller applies an offset to the flux command calculator to draw sufficient power to prevent thermal runaway (step 264).

Figure 3A:
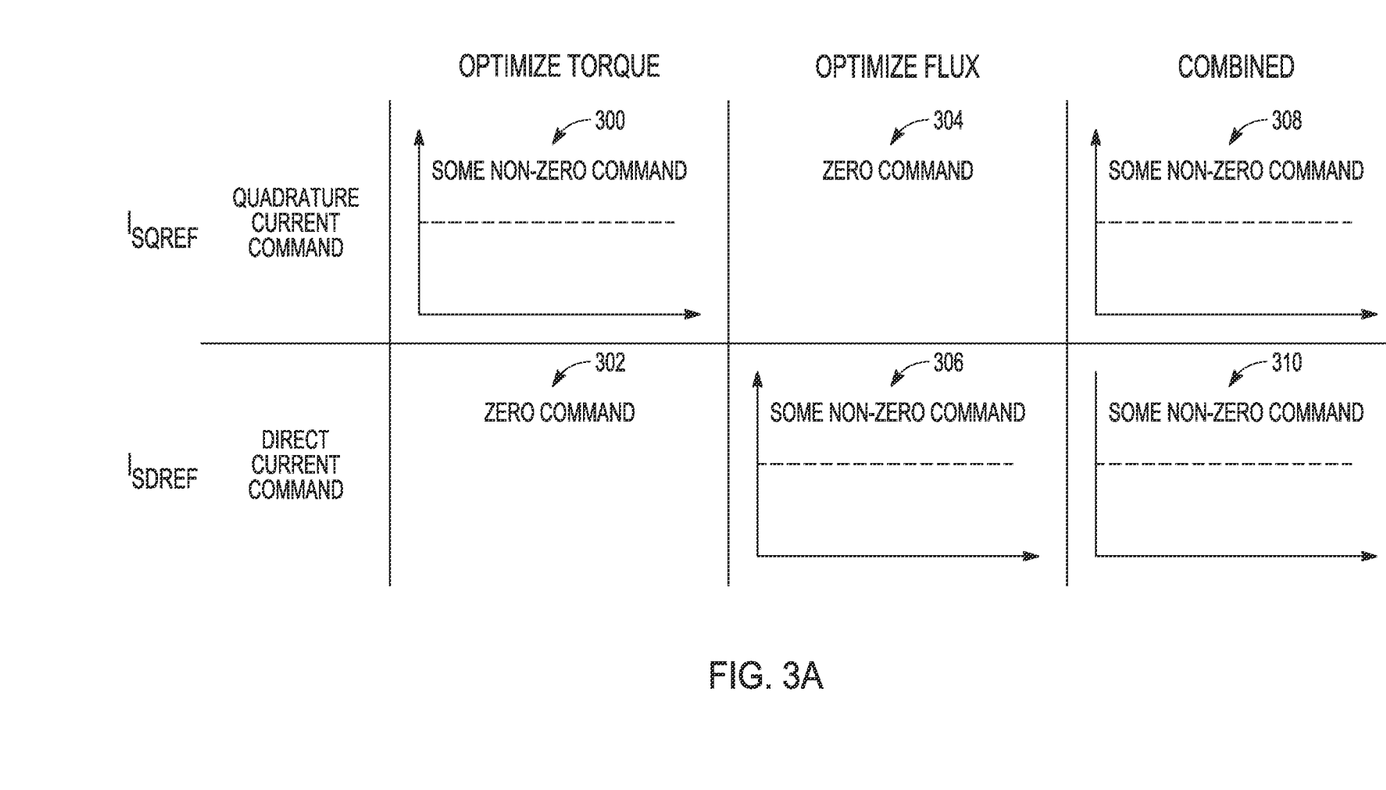
FIGS. 3A-3B are plots of the torque and signal command currents and the power drawn from the thermal battery for varying operating conditions under an optimized mode.
Figure 3B:
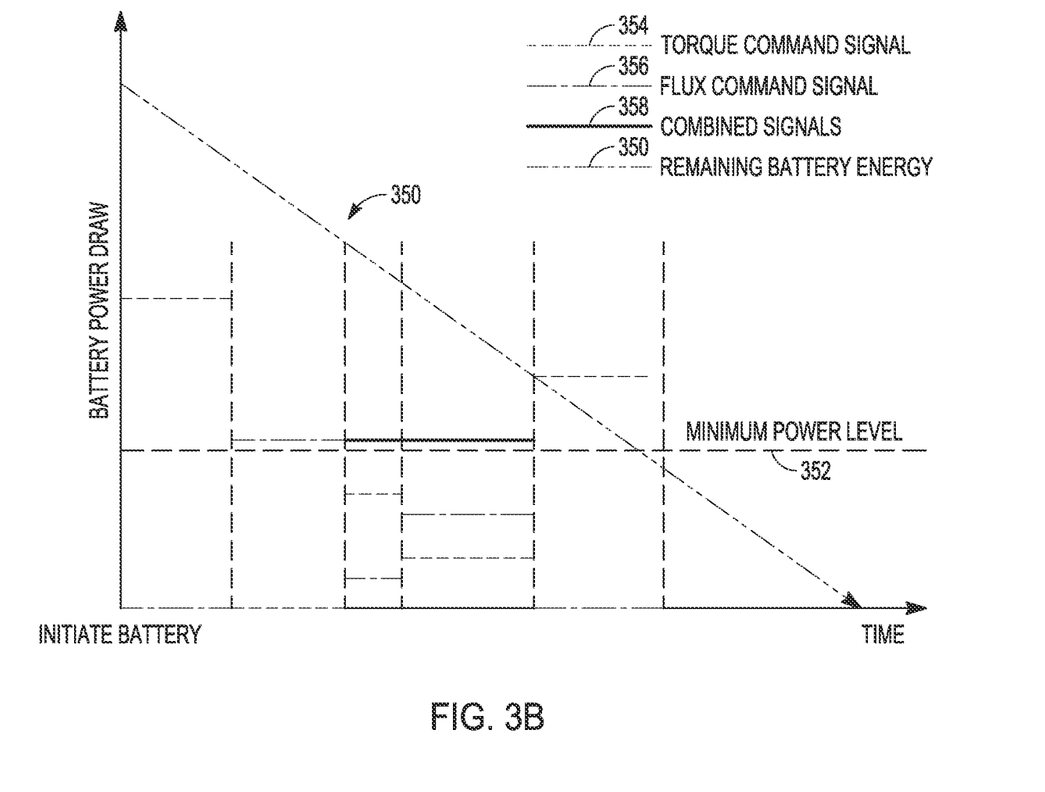

Referring now to FIGS. 3A-3B, in an example in which the power controller is operating in "optimized mode" the torque and flux command signals $I_{SQREF}$ and $I_{SDREF}$, respectively, can be commanded to address three different states. As shown in FIG. 3A, the torque command signal $I_{SQREF}$ can be command to a non-zero value 300 to provide the desired torque. This non-zero value draws sufficient current from the battery to exceed the minimum power level. Therefore the flux command signal $I_{SDREF}$ is commanded to a zero value (the offset is zero) 302. This is a condition to optimize torque and consistent with normal operation of the motor controller. Second, the torque command signal $I_{SQREF}$ can be command to a zero value 304 to provide no torque (e.g., a failure or interruption). This zero value draws no current from the battery. Therefore the flux command signal $I_{SDREF}$ is commanded to a non-zero value 306 (the offset is non-zero) sufficient to draw enough power from the battery to exceed the minimum power level. This is a condition to optimize flux (heat dissipation) in the multi-phase motor. Although dissipating heat in the motor is generally undesirable it is preferable to the consequence of thermal runway. Third, the torque command signal $I_{SQREF}$ can be command to a non-zero value 308 to provide the desired torque. However, this non-zero value does not by itself draw sufficient current from the battery to exceed the minimum power level. Therefore the flux command signal $I_{SDREF}$ is commanded to a non-zero value (the offset is zero) 310 to draw additional power from the battery to prevent thermal runaway. This is a condition for mixed torque production and heat dissipation.

As shown in FIG. 3B, a thermal battery depletes its energy 350 over a period of time. The thermal battery also exhibits a minimum power level 352 that must be drawn over or within some time period to prevent overheating and thermal runaway. In a first state, the torque command signal 354 to provide the desired torque is sufficient to satisfy the minimum power level so the offset and flux command signal 356 remain at zero. In a second state, the torque command signal is zero. The offset and flux command signal are command to a non-zero value in order to draw sufficient power from the battery to exceed the minimum power level. All of this power is dissipated in heat in the motor. In third and fourth states, the torque command signal is non-zero to provide the desired torque but is insufficient to satisfy the minimum power level draw. In each case, the power controller calculates the required offset such that the combined signals 358 satisfy the minimum power draw. In a fifth state, the torque command signal to provide the desired torque is sufficient to satisfy the minimum power level so the offset and flux command signal remain at zero. This continues until the thermal battery is depleted or the mission is completed. At termination of the mission, the controller may still produce a non-zero flux command signal to draw power from the battery to prevent thermal runaway and possible problems.

Figure 4:
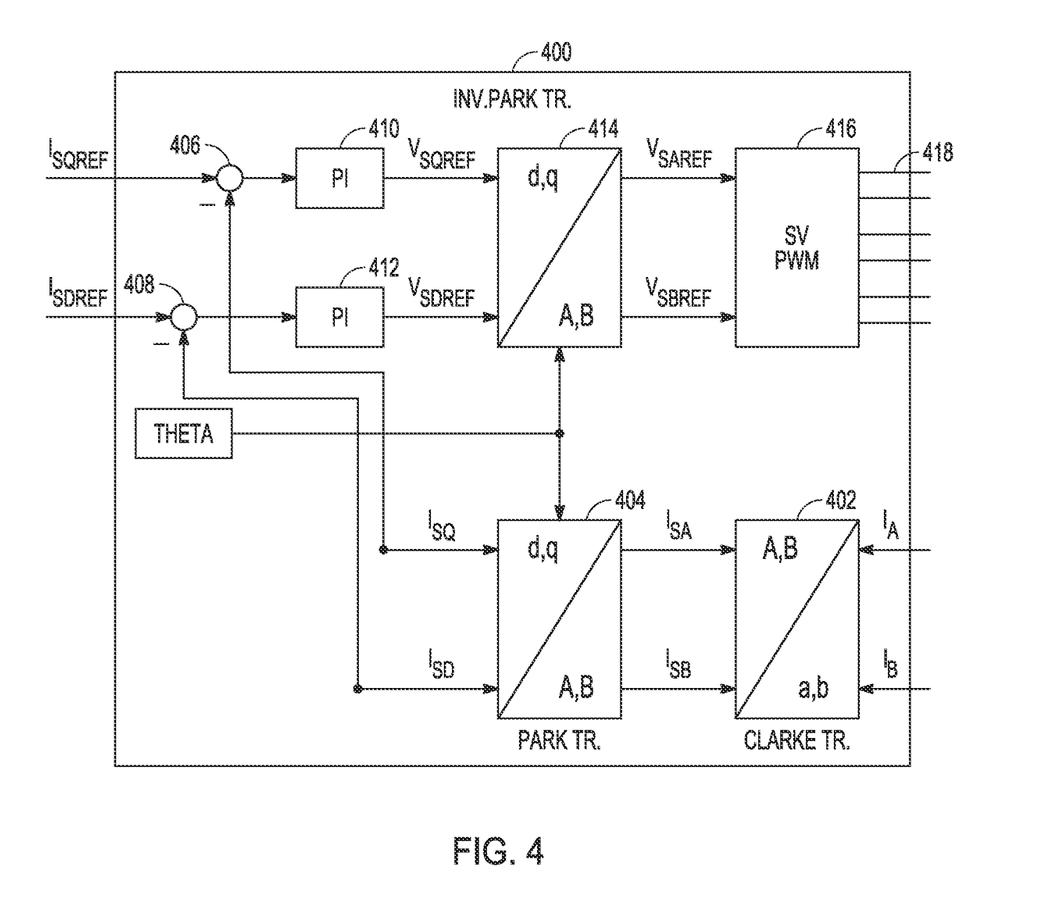
FIG. 4 is a diagram of an embodiment of a field-oriented control motor controller.

Referring now to FIG. 4, in an embodiment of a FOC motor-controller 400 two motor phase currents $i_A$ and $i_B$ are measured at the output of the power inverter (input of the multi-phase motor). These measurements feed a Clarke transformation module 402. The outputs of this projection are designated $i_{SA}$ and $i_{SB}$. These two components of the current along with the rotor flux position (THETA) are the inputs of a Park transformation module 404 that transforms them to currents $i_{SD}$ and $i_{SQ}$ in a D, Q rotating reference frame. The $i_{SD}$ and $i_{SQ}$ components are compared to the references $i_{SDREF}$ (the flux reference corresponding to the "flux command signal") and $i_{SQREF}$ (the torque reference corresponding to the "torque command signal") at summing nodes 406 and 408. When controlling a multi-phase motor, $i_{SDREF}$ is set to zero since all of the energy should be produced as torque. The $i_{SQREF}$ receives either an external reference or is tied to an external feed back controller. The outputs of the proportion-integration (PI) current regulators 410 and 412 are voltages $V_{SDREF}$ and $V_{SQREF}$, which are applied to an inverse Park transform module 414. Using the position of rotor flux (THETA), this projection generates $V_{SAREF}$ and $V_{SBREF}$, which are the components of the stator vector voltage in the stationary orthogonal reference frame. These are the inputs to a Space Vector Pulse-Width Modulation (PWM) module 416, which produces the PWM motor control signals 418 that drive the power inverter. A more complete description of FOC of multi-phase motors is described in Ramesh T. Ramamoorthy et. al., "Sensored Field Oriented Control of 3-Phase Permanent Magnet Synchronous Motors Using TMS320F2837x", Texas Instruments, Application Report SPRABZ0, February 2016, the contents of which are hereby incorporated by reference.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A controller for a multi-phase motor, comprising:
   a thermal battery configured upon initiation to deliver electrical power to the multi-phase motor, wherein the multi-phase motor must draw at least a minimum power level to prevent thermal runaway of the thermal battery;
   a field-oriented motor controller configured to generate one or more motor control signals for the multi-phase motor, said one or more motor control signals responsive to a torque command signal and a flux command signal;
   a torque command calculator, coupled to said field-oriented motor controller, configured to generate said torque command signal to command a desired torque;
   a flux command calculator, coupled to the field-oriented motor controller, configured to generate said flux command signal to command a desired flux; and
   a power controller configured to generate an offset to said flux command signal to draw power from the thermal battery at a power level that exceeds the minimum power level to prevent thermal runaway while providing said desired torque.

2. The controller of claim 1, wherein any additional power drawn from the thermal battery responsive to the offset of said flux command to ensure that the power level exceeds the minimum power level is dissipated as heat in the multi-phase motor.

3. The controller of claim 2, wherein the controller includes no additional hardware to ensure that the power level exceeds the minimum power level is dissipated as heat in the multi-phase motor.

4. The controller of claim 1, wherein in a failure mode the torque command calculator is configured to generate the torque command signal with a value of zero, said power controller is configured to generate the offset such that the flux command signal draws all of the power from the thermal battery to ensure that the power level exceeds the minimum power level and all of the power is dissipated as heat in the multi-phase motor and the multi-phase motor provides zero torque.

5. The controller of claim 1, wherein the power controller is configured to provide a fixed offset such that the flux command signal draws sufficient power to ensure that the power level exceeds the minimum power level regardless of any power drawn by the torque command signal.

6. The controller of claim 1, wherein the power controller is configured responsive to a real-time measure of the actual power drawn from the battery to calculate the offset, wherein a portion of the power level is used to provide the desired torque to the multi-phase motor and a remaining portion of the power level is dissipated as heat in the multi-phase motor.

7. The controller of claim 1, wherein the real-time measure is a direct measurement of current drawn from the thermal battery.

8. The controller of claim 1, wherein the real-time measure is a measurement of a torque phase current measurement feedback to the motor-controller.

9. The controller of claim 1, wherein the power controller is configured responsive to variable and intermittent time periods of zero torque production to apply the offset to the torque command signal to draw a power level sufficient to exceed the minimum power level.

10. The controller of claim 1, wherein the power controller is configured to pulse-width modulate the offset.

11. A method for controlling a multi-phase motor, the multi-phase motor powered by energy from a thermal battery, which upon initiation must draw at least a minimum power level to prevent thermal runaway of the thermal battery, said method comprising:
    initiating the thermal battery to generate energy;
    generating a torque command signal to command a desired torque,
    generating a flux command signal to command a desired flux,
    generating one or more field-oriented motor control signals for the multi-phase motor, said one or more motor control signals responsive to said torque command signal and said flux command signal to provide the desired torque to the multi-phase motor; and
    generating an offset to said flux command signal to draw power from the thermal battery at a power level that exceeds the minimum power level to prevent thermal runaway.

12. The method of claim 11, wherein in a failure mode the torque command signal has a value of zero, wherein the offset is generated such that the flux command signal draws all of the power from the thermal battery to ensure that the power level exceeds the minimum power level and all of the power is dissipated as heat in the multi-phase motor and the multi-phase motor provides zero torque.

13. The method of claim 11, wherein the offset is generated at a fixed value such that the flux command signal draws sufficient power to ensure that the power level exceeds the minimum power level regardless of any power drawn by the torque command signal.

14. The method of claim 11, wherein the offset is generated responsive to a real-time measure of the actual power drawn from the battery, wherein a portion of the power level is used to provide the desired torque to the multi-phase motor and a remaining portion of the power level is dissipated as heat in the multi-phase motor.

15. The method of claim 11, wherein responsive to variable and intermittent time periods of zero torque production, the offset is generated and applied to the torque command signal to draw the power level sufficient to exceed the minimum power level.

16. A method for controlling a multi-phase motor in which the multi-phase motor is powered by energy from a thermal battery, which upon initiation must draw at least a minimum power level to prevent thermal runaway of the thermal battery and in which a field-oriented motor controller generates one or more motor control signals for the multi-phase motor, said one or more motor control signals responsive to a flux command signal and a torque command signal calculated to command a desired torque, said method comprising:
    initiating the thermal battery to generate energy to power the multi-phase motor; and generating an offset to said flux command signal to draw power from the thermal battery at a power level that exceeds the minimum power level to prevent thermal runaway.

17. The method of claim 16, wherein in a failure mode the torque command signal has a value of zero, wherein the offset is generated such that the flux command signal draws all of the power from the thermal battery to ensure that the power level exceeds the minimum power level and all of the power is dissipated as heat in the multi-phase motor and the multi-phase motor provides zero torque.

18. The method of claim 16, wherein the offset is generated at a fixed value such that the flux command signal draws sufficient power to ensure that the power level exceeds the minimum power level regardless of any power drawn by the torque command signal.

19. The method of claim 16, wherein the offset is generated responsive to a real-time measure of the actual power drawn from the battery, wherein a portion of the power level is used to provide the desired torque to the multi-phase motor and a remaining portion of the power level is dissipated as heat in the multi-phase motor.

20. The method of claim 16, wherein responsive to variable and intermittent time periods of zero torque production, the offset is generated and applied to the torque command signal to draw the power level sufficient to exceed the minimum power level.

\* \* \* \* \*